June 19, 1923.

W. G. COX 1,459,321

END SHIELD FOR MOTOR VEHICLES

Filed March 21, 1923

2 Sheets-Sheet 1

Inventor
W. G. Cox.

By Fisher, Moser & Moon
Attorneys

June 19, 1923.  1,459,321
W. G. COX
END SHIELD FOR MOTOR VEHICLES
Filed March 21, 1923   2 Sheets-Sheet 2
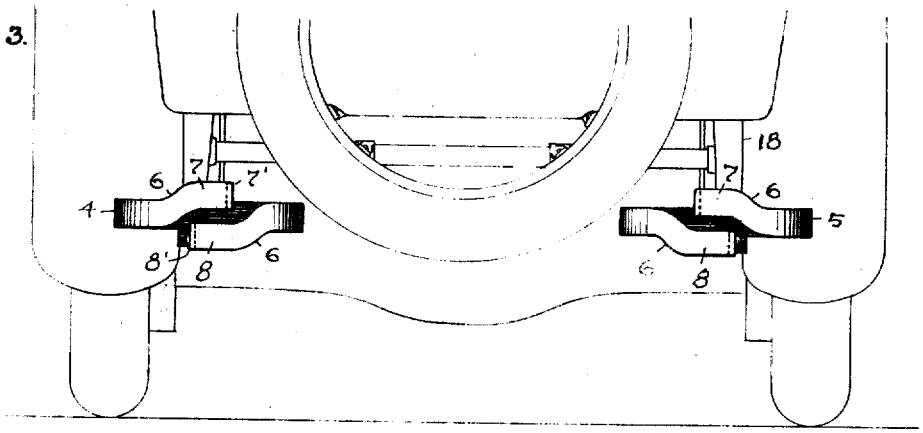
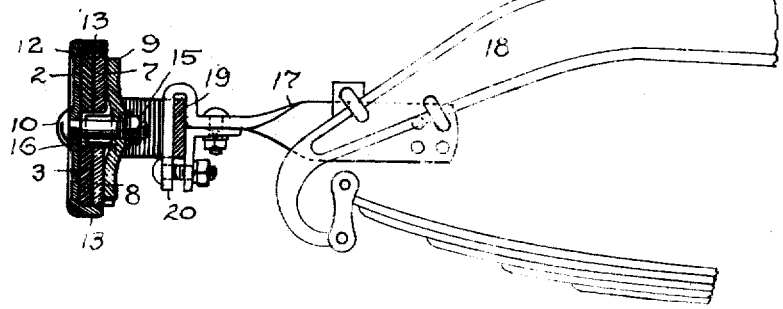
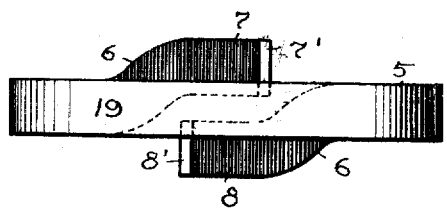
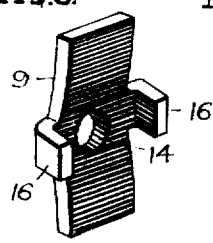
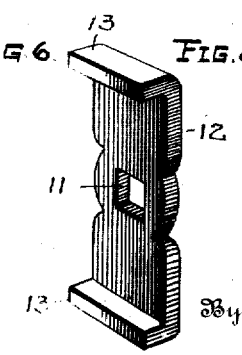
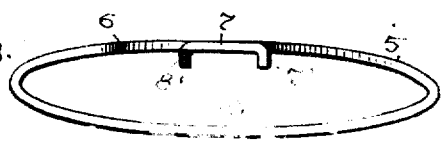
Inventor
W. G. COX.
By
Attorneys Patented June 19, 1923.

1,459,321

UNITED STATES PATENT OFFICE.

WILLIAM G. COX, OF CLEVELAND, OHIO.

END SHIELD FOR MOTOR VEHICLES.

Application filed March 21, 1923. Serial No. 626,505.

*To all whom it may concern:*

Be it known that I, WILLIAM G. COX, a citizen of the United States, residing at Cleveland, in the county of Cuyahoga and State of Ohio, have invented certain new and useful Improvements in End Shields for Motor Vehicles, of which the following is a specification.

The present improvement in an end shield for a motor vehicle, resides in the novel assemblage and construction of parts herein shown and described and more concisely pointed out in the claims, whereby a substantial area of protecting and buffing surface is obtained by the use of parallel bars and a substantial cushioning and shock-absorbing effect may be realized by the employment of spring yokes of substantially elliptical or elongated bow-shaped form having offset ends adapted to provide separate seating junctions and places of union at different elevations for the separate bars. As exemplified herein, the buffer bars and elliptical yokes are clamped separably together by independent clamping devices which permit the yokes to be spaced apart different distances longitudinally of the bars for attachment to motor-vehicle frames of different widths, and the yokes are also adapted to be clamped adjustably in suitable clamping brackets or extensions affixed to or forming part of the motor-vehicle frame.

Figure 1:
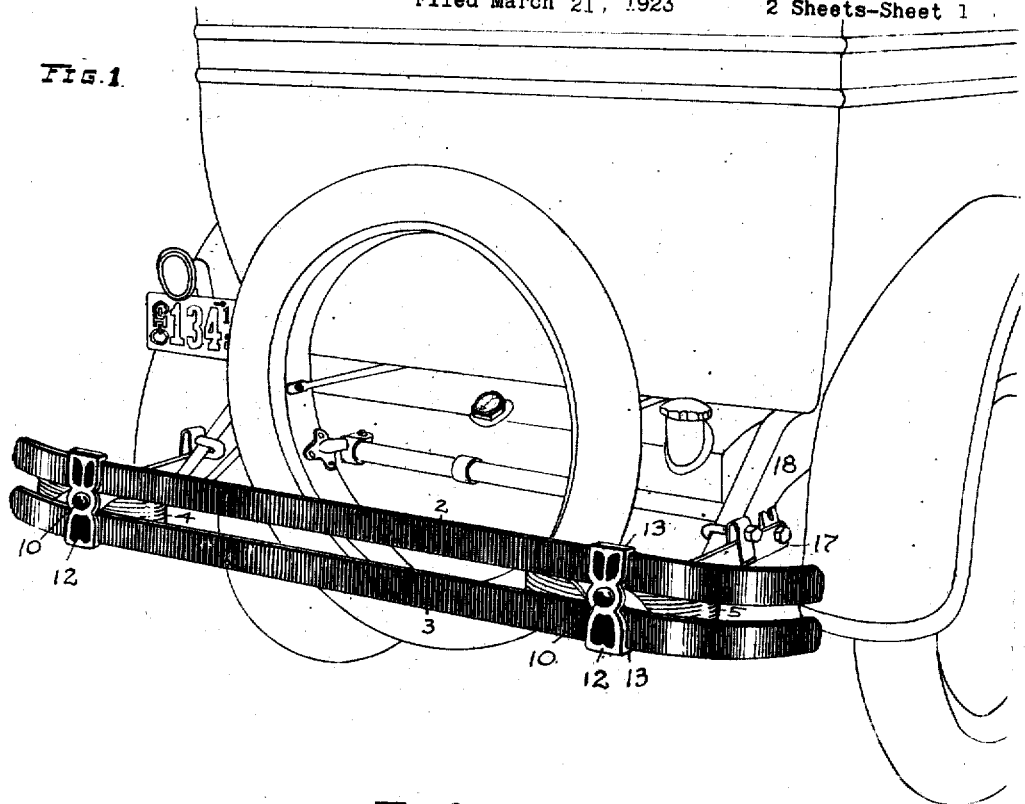
Figure 2:
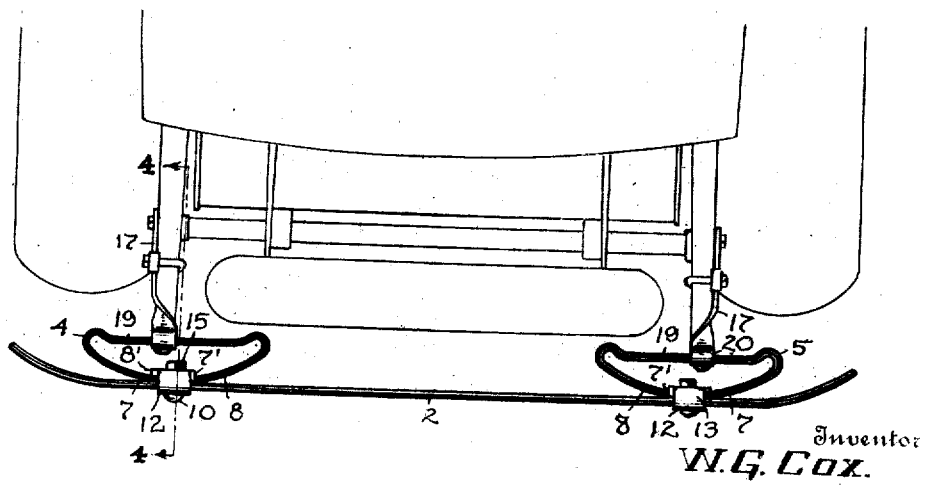

In the accompanying drawings, Fig. 1 is a perspective view of the rear end of a motor vehicle having one of my improved end shields mounted thereon, and Fig. 2 is a top view of the same vehicle and shield. Fig. 3 is a rear view of the vehicle showing the yokes in place thereon but with the parallel bars removed. Fig. 4 is an enlarged side elevation of a part of the vehicle frame and a vertical cross section on line 4—4 of Fig. 2 of the bars and one of the yokes at their juncture where clamped together. Figs. 5 and 6 are perspective views of a pair of complementary clamping plates for each yoke and the bars. Figs. 7 and 8 are rear and top views, respectively, of a preferred form of elliptical yoke.

In detail the invention comprises a pair of bars or rails 2 and 3, respectively, which may be made either of metal or wood. Flat and relatively thin spring bar metal is preferably used, but rods or bars of any desired cross-section or shape may be employed instead. I also prefer to use two bars of equal length and to curve the opposite ends of the bars rearwardly but this is optional and a matter of design, and the extreme ends of the bars may be rounded as shown or formed in any suitable way to avoid sharp or pointed edges. The length of the bars is substantially equal to the width of the motor-vehicle to be protected, and the bars are superposed edge to edge in spaced parallel relation to place their rear and front flat sides in the same vertical planes and thereby provide a substantial area of buffing and protecting surface opposite the end of the motor-vehicle, either front or rear end, as the case may be.

The two bars are rigidly united in the aforesaid relation by a pair of yoke members 4 and 5 of corresponding shape and construction. Thus, each yoke is made of a flat spring bar of metal bent into a substantially elliptical form, and the free ends or arms of the bar are offset vertically at 6 a short distance back from their extremities to provide two straight horizontal clamping portions 7 and 8, respectively, extending parallelly in overlapping spaced relation edge to edge. This places the ends 7 and 8 horizontally one above the other, or in different horizontal planes, with their front flat surfaces in the same vertical plane, and the extremity of each part 7 and 8 is bent rearwardly at right angles to provide a short straight vertically-extending lip 7' and 8', respectively. These lips are thus spaced apart and co-act to align and hold a straight-edged clamping piece 9 between them when the two ends 7 and 8 are clamped jointly against the rear sides of the two bars 2 and 3, respectively. Such clamping is effected by a single bolt 10 passing through a square opening 11 in a vertically-disposed clamping plate 12 spanning the gap between said bars and engaged with the front sides of the bars and having rearwardly-extending flanges 13—13 at its top and bottom overlapping the top and bottom edges of the bars 2 and 3, respectively, the said flanges being also long enough to overlap the corresponding edges of the yoke ends or arms 7 and 8, respectively, (see Fig. 4) thereby squarely aligning the clamping plate 12 and the yoke ends with the parallel bars. Bolt 10 has a square neck to fit within the square opening 11, and its round screw-threaded end extends through a round opening 14 centrally within the rear clamping piece 9 which is bulged or swelled rearwardly between its ends to provide a raised seat for the lock washer and nut 15 for the bolt and also to permit the extremities of clamping piece 9 to seat solidly with spring action against the rear flat sides of the yoke arms 7 and 8. Rear clamping piece 9 is also formed with a pair of angularly-bent locking fingers 16 at its side edges opposite the central bolt opening 14, and these fingers extend into the space between the yoke arms 7 and 8 and also the space between the parallel bars 2 and 3, thereby fixing the bars and yoke arms in definitely spaced and aligned relation and also preventing the rear clamping piece 9 from turning from its vertical position relatively to the yoke and bars in the event nut 15 should loosen.

It is in this way that each elliptical yoke is held in horizontal alignment with the buffer bars and the two bars rigidly yoked together in spaced relation, and the union between the yokes and bars is a frictionally clamping one which permits the yokes when unclamped to be shifted longitudinally in respect to each other and the opposite ends of the bars so that the yokes may be placed nearer together or farther apart as the requirements for attachment to any motor vehicle may demand. This is of advantage in attaching similar shields to the opposite ends of the chassis frames of many motor vehicles in general use, such for example as are wider at their rear ends than at their front ends, and where the adjustable yoke arrangement described will permit convenient setting and attachment of the yoke to the side members of the frame at either end. Attachment to the vehicle frame may be made in a variety of ways, and one mode of attachment is shown in Figs. 1 and 4, wherein a clamping arm or bracket 17 is bolted to the slanting curved frame end 18, and the rear cross connecting part 19 of the yoke is rigidly secured within the clamping end 20 of the bracket. The cross connecting part 19 of the yoke may be either straight as shown in Fig. 2, or curved or bowed as delineated in Fig. 8, and the divided front part of the yoke may also be straight or curved but preferably curved or bowed to enhance the spring action and resiliency of the yoke.

What I claim, is:

1. An end shield for a motor vehicle, comprising horizontal buffer bars, and spring yokes having overlapping ends united with said bars.

2. An end shield for a motor vehicle, comprising horizontal buffer bars, and a pair of spring supporting yokes for said bars, each yoke having free ends spread apart vertically and connected to separate bars.

3. An end shield for a motor vehicle, comprising horizontal buffer bars, horizontally-extending yokes having their opposite ends offset vertically and engaged with separate bars, and clamping devices uniting said bars and the free ends of the yokes together.

4. An end shield for a motor vehicle, comprising a pair of horizontal buffer bars, elliptical spring yokes having vertically overlapped ends engaging said bars, and clamping devices uniting the ends of each yoke and said bars together.

5. An end shield for a motor vehicle, comprising a pair of parallel buffer bars, a pair of elliptical yokes having separated ends in different horizontal planes engaging said bars, and vertically-disposed clamping devices connecting the separated ends of said yokes and said bars together.

6. An end shield for a motor vehicle, comprising a pair of parallel buffer bars, a pair of spring-supporting members for said bars having reverted overlapping ends lying in different horizontal planes, and means uniting said bars to the ends of said members.

7. An end shield for a motor vehicle, comprising a pair of resilient bow-shaped members each having free ends in the same vertical plane extending in opposite directions beyond each other in different horizontal planes, a pair of buffer bars horizontally arranged one above the other opposite the respective ends of said supporting members, and clamping devices connecting said bars and the respective ends of each supporting member together.

8. An end shield for a motor vehicle, comprising a pair of buffer bars, a pair of supporting bars having reverted bowed end portions overlapping each other edgewise adapted to support said buffer bars parallelly one above the other in the same vertical plane, and clamping couplings for said bars and end portions.

9. An end shield for a motor vehicle, comprising a pair of bow-shaped members each having oppositely-extending overlapping ends lying in different horizontal planes and terminating in angular lips, parallel buffer bars engaged with corresponding ends of said bow-shaped members, and opposed clamping plates engaging said bars and ends vertically between the lips on said overlapping ends.

10. An end shield for a motor vehicle, comprising parallel buffer bars, separated supporting arms engaging said bars in places vertically opposite each other, a clamping plate spanning the front sides of said buffer bars, a clamping piece spanning the rear sides of said arms having fingers projecting forwardly between said arms, and a clamping bolt for said clamping plate and piece.

11. A spring supporting yoke for a parallel bar shield for a motor vehicle, consisting of a flat metal bar having its opposite ends bent reversely toward each other, said bar being offset vertically at its ends to permit the opposite ends to lie in the same vertical p ne and provide separate seats at different elevations for said parallel bars.

12. A spring supporting member for a motor vehicle shield embodying parallel buffer bars, consisting of a metal bar bent into the form of a yoke having a horizontal rear connecting portion and separated horizontal arms offset vertically in respect to each other and extending toward and beyond each other in the same vertical plane to permit said buffer bars to be separately attached to said arms.

In testimony whereof I affix my signature hereto.

WILLIAM G. COX.

Witness:
DOROTHY M. MOSER.